US005987624A

United States Patent [19]

Eglit

[11] Patent Number: 5,987,624

[45] Date of Patent: Nov. 16, 1999

[54] METHOD AND APPARATUS FOR AUTOMATICALLY DETERMINING SIGNAL PARAMETERS OF AN ANALOG DISPLAY SIGNAL RECEIVED BY A DISPLAY UNIT OF A COMPUTER SYSTEM

[75] Inventor: Alexander Julian Eglit, Half Moon Bay, Calif.

[73] Assignee: Paradise Electronics, Inc., San Jose, Calif.

[21] Appl. No.: 08/872,764

[22] Filed: Jun. 10, 1997

[51] Int. Cl.[6] .................... G06F 11/00

[52] U.S. Cl. .................... 714/32; 345/145

[58] Field of Search .................... 714/32, 5, 25, 714/27, 30, 39, 41, 44, 45, 46, 48, 715, 720, 721, 728, 733, 739, 18, 20, 37, 758; 364/550, 551.01; 345/145–147, 159, 150, 153; 348/180, 181, 187, 207, 222; 358/504

[56] References Cited

U.S. PATENT DOCUMENTS

| | | | |
|---|---|---|---|
| Re. 33,916 | 5/1992 | Saenz et al. | 340/703 |
| 4,086,579 | 4/1978 | Easter | 340/324 |
| 4,230,974 | 10/1980 | Haak | 315/399 |
| 4,707,638 | 11/1987 | Hara et al. | 315/169.3 |
| 4,991,023 | 2/1991 | Nicols | 358/242 |
| 5,031,118 | 7/1991 | Morizot | 364/521 |
| 5,216,412 | 6/1993 | Gawell et al. | 340/720 |
| 5,241,281 | 8/1993 | Wilkes et al. | 340/799 |
| 5,285,197 | 2/1994 | Schmidt et al. | 345/213 |
| 5,302,950 | 4/1994 | Johnson et al. | 341/123 |
| 5,319,446 | 6/1994 | Emmoto et al. | 348/181 |
| 5,351,201 | 9/1994 | Harshbarger, Jr. et al. | 364/551.01 |
| 5,404,153 | 4/1995 | Kim | 345/213 |
| 5,438,341 | 8/1995 | Kobayashi et al. | 345/20 |
| 5,457,473 | 10/1995 | Arai et al. | 345/10 |
| 5,479,643 | 12/1995 | Bhaskar et al. | 395/500 |
| 5,483,260 | 1/1996 | Parks et al. | 345/156 |
| 5,499,040 | 3/1996 | McLaughlin et al. | 345/146 |
| 5,537,145 | 7/1996 | Miseli | 348/181 |
| 5,548,307 | 8/1996 | Onagawa | 345/213 |
| 5,550,556 | 8/1996 | Wu et al. | 345/14 |
| 5,565,897 | 10/1996 | Kikinis | 345/213 |
| 5,570,108 | 10/1996 | McLaughlin et al. | 345/146 |
| 5,572,444 | 11/1996 | Lentz et al. | 364/551.01 |
| 5,579,029 | 11/1996 | Arai et al. | 345/132 |
| 5,602,567 | 2/1997 | Kanno | 345/132 |
| 5,671,011 | 9/1997 | Kim | 348/189 |
| 5,739,809 | 4/1998 | McLaughlin et al. | 345/150 |
| 5,764,209 | 6/1998 | Hawthorne et al. | 345/87 |
| 5,798,790 | 8/1998 | Knox et al. | 348/191 |
| 5,847,701 | 12/1998 | Eglit | 345/204 |
| 5,864,370 | 1/1999 | Knox | 348/674 |

FOREIGN PATENT DOCUMENTS

| | | | |
|---|---|---|---|
| 4-269796 | 9/1992 | Japan . | |
| 5-35240 | 2/1993 | Japan . | |
| 8-160928 | 8/1996 | Japan . | |
| 8-202330 | 8/1996 | Japan . | |
| WO 93/0658 | 4/1993 | WIPO | G09G 5/00 |

OTHER PUBLICATIONS

Satoh et al., 3D Image display with motion parallax by camera matrix stereo, Proceed. of the third IEEE International Conference, pp. 349–357, Sep. 1996

*Primary Examiner*—Robert W. Beausoliel, Jr.
*Assistant Examiner*—Nadeem Iqbal
*Attorney, Agent, or Firm*—Law Firm of Naren Thappeta

[57] ABSTRACT

A computer system in which the signal parameters of an analog display signal received by a display unit can be determined automatically. A test data having a predetermined format is sent to a display unit. The test data is encoded to enable display unit to measure display signal parameters such as the timing signals (e.g., start position of each horizontal line) accurately. The test data also includes black and white points, which enable the display unit to measure the voltage levels used to represent black and white signals. Display unit can accordingly adjust the manner in which individual points on a display screen are actuated so that the full scale of brightness levels on individual points can be utilized. CRC-based techniques are used to indicate to the display unit the presence of the test data as the same communication path is used to send test data and display data.

25 Claims, 10 Drawing Sheets

METHOD AND APPARATUS FOR AUTOMATICALLY DETERMINING SIGNAL PARAMETERS OF AN ANALOG DISPLAY SIGNAL RECEIVED BY A DISPLAY UNIT OF A COMPUTER SYSTEM

RELATED APPLICATIONS

The present application is related to the following co-pending Patent Applications, which are both incorporated in their entirety into the present application herewith:

1. Patent Application entitled, "A Method and Apparatus for Upscaling an Image", Filed Feb. 24, 1997, having Ser. No. 08/804,623 and Attorney Docket Number: PRDN-0001;

2. Patent Application entitled, "A Method and Apparatus for Clock Recovery in a Digital Display Unit", Filed Feb. 24, 1997, having Ser. No. 08/803,824 and Attorney Docket Number: PRDN-0002; and 3. Patent Application entitled, "A Method and Apparatus Implemented in a Computer System for Determining the Frequency Used by a Graphics Source for Generating an Analog Display Signal", Serial Number: UNASSIGNED, Filed Concurrently herewith and having Attorney Docket Number: PRDS-0005.

BACKGROUND OF THE INVENTION

1. Field of the Invention

The present invention relates to computer graphics systems, and more specifically to a system and method for automatically determining the signal parameters of an analog display signal received by a display unit of a computer system.

2. Related Art

Display units are often used in computer systems to display images. Typically, an image is sent to a display unit encoded in the form of an analog signal (e.g., RGB signals) and the display unit reproduces the image represented by the analog signal. For a proper reproduction of the image, it may be necessary to determine the signal parameters (explained below) of the analog signal.

In general, signal parameters are the values which enable a display unit to reproduce an image represented by the analog display signal. For example, as is well known in the art, an analog display signal can include several portions, with each portion representing a frame of an image. Each such portion can include several sub-portions, with each sub-portion representing a horizontal line. Several such horizontal lines together constitute a frame.

For an accurate reproduction of an image represented by an analog signal, a display unit may need to accurately determine the instances or points on an analog display signal which correspond to start positions ("horizontal start positions") of these horizontal lines and/or frames. Similarly, a display unit may need to determine other parameters such as vertical start position, height and width of an image for an accurate reproduction. Such parameters, which may be needed for accurate reproduction of an image are termed as display signal parameters in the present application.

Without such an accurate determination of one or more of the above noted parameters, a portion of an image may not be displayed on a screen of a display unit. As an illustration, if a horizontal start position is determined to be at a position later than a correct horizontal start position, some of the left portion of the horizontal line may not be displayed. On the other hand, if horizontal start position is determined to be at a position earlier than a correct horizontal start position, some of the right portion of the horizontal line may not be displayed.

Some prior systems attempt to use only a part of a digital display screen area as a matter of design so that inaccurate determination of a start position described above will not necessarily result in an image portion not being displayed. That is, under this scheme, if a start position is determined to be earlier or later than a correct start position, the sampled image may be displayed on a part of the display screen, which part may not be otherwise used if the start positions were to be correctly sampled. One problem with such a scheme is that the design employed there does not make full use of the display screen area under correct operating circumstances.

In an alternative scheme, a user is provided the option to manually adjust the start positions, height and width. Unfortunately, such manual schemes may be undesirable, particularly in consumer markets where the users may not be willing or sophisticated to use such manual features.

There are other display parameters which may be important for an accurate reproduction of an image represented by an analog display signal. Voltage swing of a digital to analog converter (DAC) is an example of such other display parameters. Voltage swing generally refers to the voltage values between the voltages used to represent maximum and minimum brightness levels of points of an image. DACs are typically situated in a computer system and generate analog display signals based on digital data representation of an image. Display units commonly receive these analog display signals and generate an image based on the received display signal.

The maximum and minimum values are typically defined by industry standards. However, manufacturing imperfections and inadequate testing often result in computer systems which have substantial deviation from the maximum and minimum voltage levels. As an illustration, according to RS-170 and VESA standards known in the art, minimum and maximum brightness levels are to be encoded in 0.0 V and 0.7 V respectively. However, these voltage levels can be in the range of 0.5 V to 1 V in typical implementations found in the market.

One problem with such deviations is that the resulting display quality may be sub-optimal. For example, if a display unit is designed to assume that maximum brightness is represented by 0.7 volts, but if a computer system generates a voltage level of 0.8 for maximum brightness, the graphics system may display all points having a voltage value above 0.7 at a maximum brightness level. Accordingly, highlight contrast is lost. On the other hand, if a computer system generates a voltage of 0.6 V (i.e., less than the correct voltage level) for the full brightness level, the full range of brightness levels possible on the display screen may not be fully utilized. In either case, the display quality is not optimal.

In some display units, a user is provided the ability to manually adjust the brightness level, and the display unit is designed to adjust the assumed voltage swing. However, the manual schemes are generally undesirable as users may not have the sophistication or desire or willingness to recognize the deviations from voltage swing levels. In addition, it may not be easy to perfectly adjust the assumed voltage swing levels manually in the display unit.

Therefore, what is needed is a scheme which enables an accurate and automatic determination of display signal parameters of an analog display signal received by a display unit.

SUMMARY OF THE INVENTION

The present invention is described in the context of a display unit receiving analog signal display frames (i.e., an analog signal portion representing a display frame) from a graphics source. The display unit can automatically determine display signal parameters used for reproducing an image encoded in an analog signal frame. To enable such an automatic determination, a graphics source encodes a test pattern (interchangeably referred to as test data also) having a predetermined format in the form of an analog signal frame and sends the analog signal frame over a communication path. In an example implementation, the test data is encoded in such a way that a display unit can automatically identify the test data and measure (or determine) the display signal parameters.

An example format includes a white color for all positions (pixels) in a first horizontal line of the test data. By examining the first horizontal line of the test data analog signal frame, the display unit can determine the vertical start position, horizontal start position and horizontal end position of horizontal lines included in each analog signal frame. In addition, the last line in the example format is encoded with white color in all positions. Accordingly, a display unit can also determine the vertical end position.

In addition, an example format is designed to include at least one white pixel (maximum brightness) and one black pixel (maximum darkness) in the test data. The display unit can determine the voltage levels used to represent the black and white pixels. Based on these voltage levels, the display unit can ensure that the full range of brightness levels available on a display screen are used for displaying the range of colors between black and white.

The example format also enables the graphics source to include other display signal parameter values in the test data. These display signal parameters may be available only at the graphics source. Examples of such display signal parameter values are the number of colors used to represent an image on the graphics source and the total number of samples in each horizontal line at the graphics source. The display unit merely needs to decode the analog signal to determine these display signal parameter values.

The graphics source uses the same communication path to send both normal analog signal frames encoding display data and analog signal frames encoding test patterns. To enable a display unit to automatically determine whether a received analog signal frame includes display data or test data, the graphics source sends an indication of the presence of a test pattern to the display unit. The display unit automatically determines the presence of the test pattern upon receiving the indication.

In an example scheme to provide such an indication, the graphics source generates a CRC code based on the test data to be sent to the display unit. The code is generated such that a predetermined syndrome is generated when the code along with the test data is processed by a CRC circuit in the display unit. Accordingly, the display unit determines that a received analog signal frame includes test data if a predetermined syndrome is generated by the CRC circuit.

In accordance with another aspect of the present invention, only one bit is encoded in each horizontal line of a analog signal frame. This is because the display unit may not have the information to determine the correct number of samples in each horizontal line. However, a horizontal synchronization signal (HSYNC) can be used to accurately associate analog signal data with individual horizontal lines. Different encoding schemes can be used to communicate the value of a bit in each horizontal line.

Thus, the present invention enables automatic determination of display signal parameters by a display unit. This is accomplished by including a graphics source which encodes an analog signal frame with a test pattern having a predetermined format and provides an indication to the display unit that the analog signal frame includes the test pattern. The display unit can measure (or decode) the display signal parameter values.

The present invention enables a display unit to determine the horizontal start position, the vertical start position, horizontal end position and vertical end position of an analog signal frame. This is accomplished by encoding at least the first and last pixels of the first and last lines of a frame with white color.

The present invention enables a graphics source to communicate a number of display signal parameter values which are available only at the graphics source. This is accomplished by ascertaining the parameter values at the graphics source and encoding the parameter values in the test pattern sent to the display unit.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

Figure 1A:
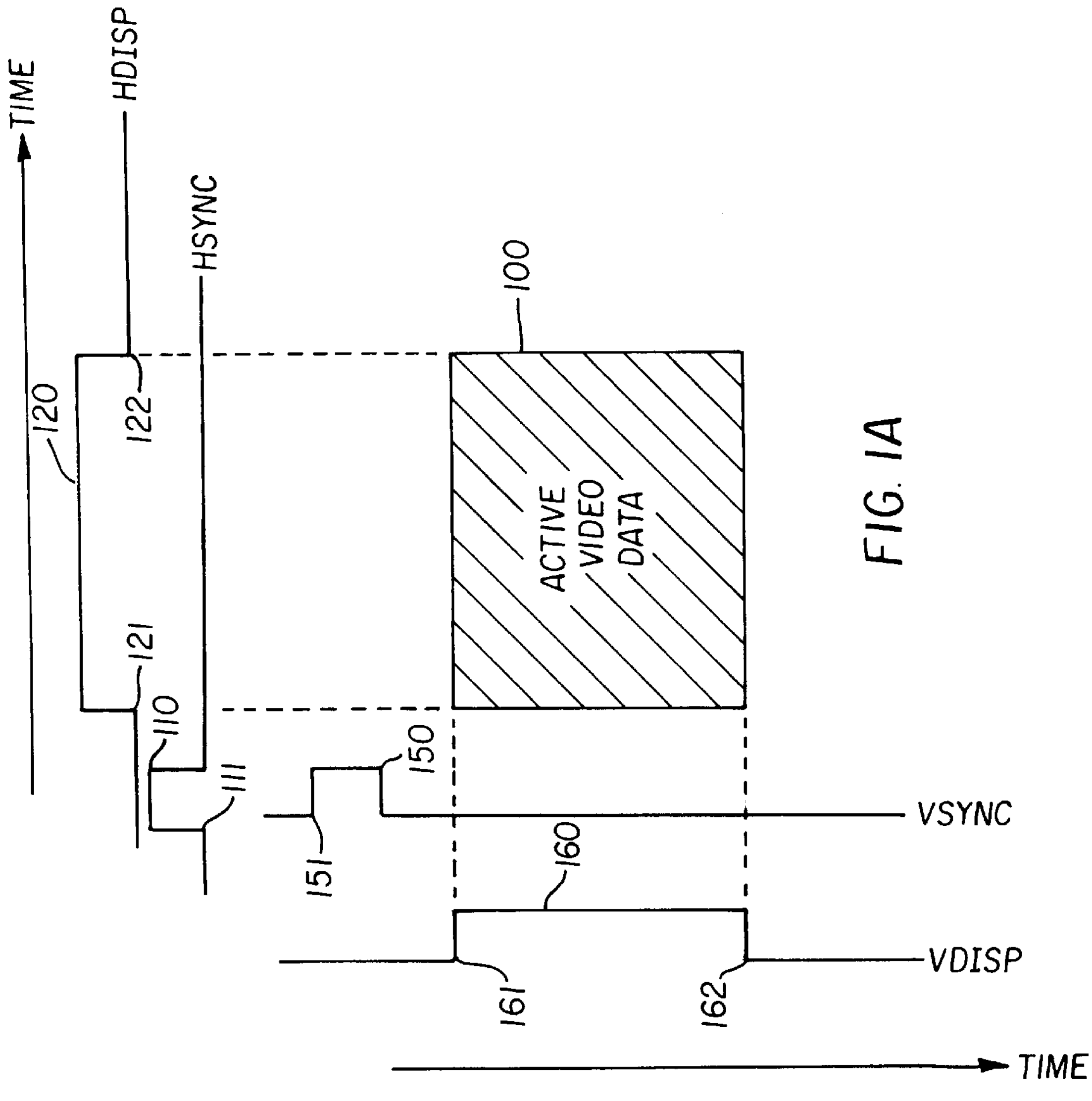
FIGS. 1A, 1B and 1C together illustrate some of the timing parameters required for reproducing an image encoded in an analog signal in an example environment.

1. Overview and Discussion of the Invention

The present invention is based on a recognition that a graphics unit can properly determine some display signal parameters if a predetermined pattern is encoded in an analog display signal, and the graphics unit 'knows' that the analog display signal represents the predetermined pattern. For example, if a graphics unit 'knows' that an entire horizontal line is encoded with a color having a voltage level beyond a predetermined threshold, the display unit can determine the start position and the end position for the horizontal line by examining the voltage level on the analog signal.

By measuring the start delay and the end delay of the first point on the horizontal line relative to any accompanying horizontal synchronization signals, the display unit may determine the correct horizontal start and horizontal end positions for subsequent horizontal lines. Vertical start position can be determined by measuring the start delay of the first horizontal line encoded with points having brightness above a predetermined threshold relative to any accompanying vertical synchronization signals.

Similarly, a display unit in accordance with the present invention can determine the voltage levels used to encode brightest (white) and darkest (black) colors if an analog signal is encoded with brightest color (hereafter "White color") and darkest color ("black color") in one or more positions of the analog signal. By knowing the voltage levels range, the display unit can ensure that the full range of brightness levels available on a display screen are used to display images represented by analog signals.

It should be understood that conventional display units with some conventional encoding schemes may not have any predetermined patterns, and may accordingly be unable to determine whether individual points on a display signal are encoded with black or white colors. Accordingly, such conventional systems may be unable to automatically determine the display signal parameters.

The present invention circumvents such problem by ensuring that the display unit knows that data pattern (also referred to as test data) encoded in an analog display signal include predetermined values. The predetermined values are chosen such that the display unit can determine several display signal parameters automatically by examining the analog signal.

In addition, the present invention enables other display signal parameter values to be encoded in the analog display signal and be communicated to a display unit. The display unit may then use these received display signal parameter values in reproducing images represented by an analog signal. Accordingly, the display on the display unit screen may be of optimal quality.

One or more embodiments of the present invention will be described in further detail below. Before describing the invention in great detail, it is useful to describe an example environment in which the invention can be implemented. The details of making and using the invention will be clear from the description.

2. Example Environment

In a broad sense, the invention can be implemented in any computer system having a display unit. Such computer systems include, without limitation, lap-top and desk-top personal computer systems (PCS), work-stations, special purpose computer systems, general purpose computer systems, and many others. The invention may be implemented in hardware, software, firmware, or combination of the like.

Figure 2:
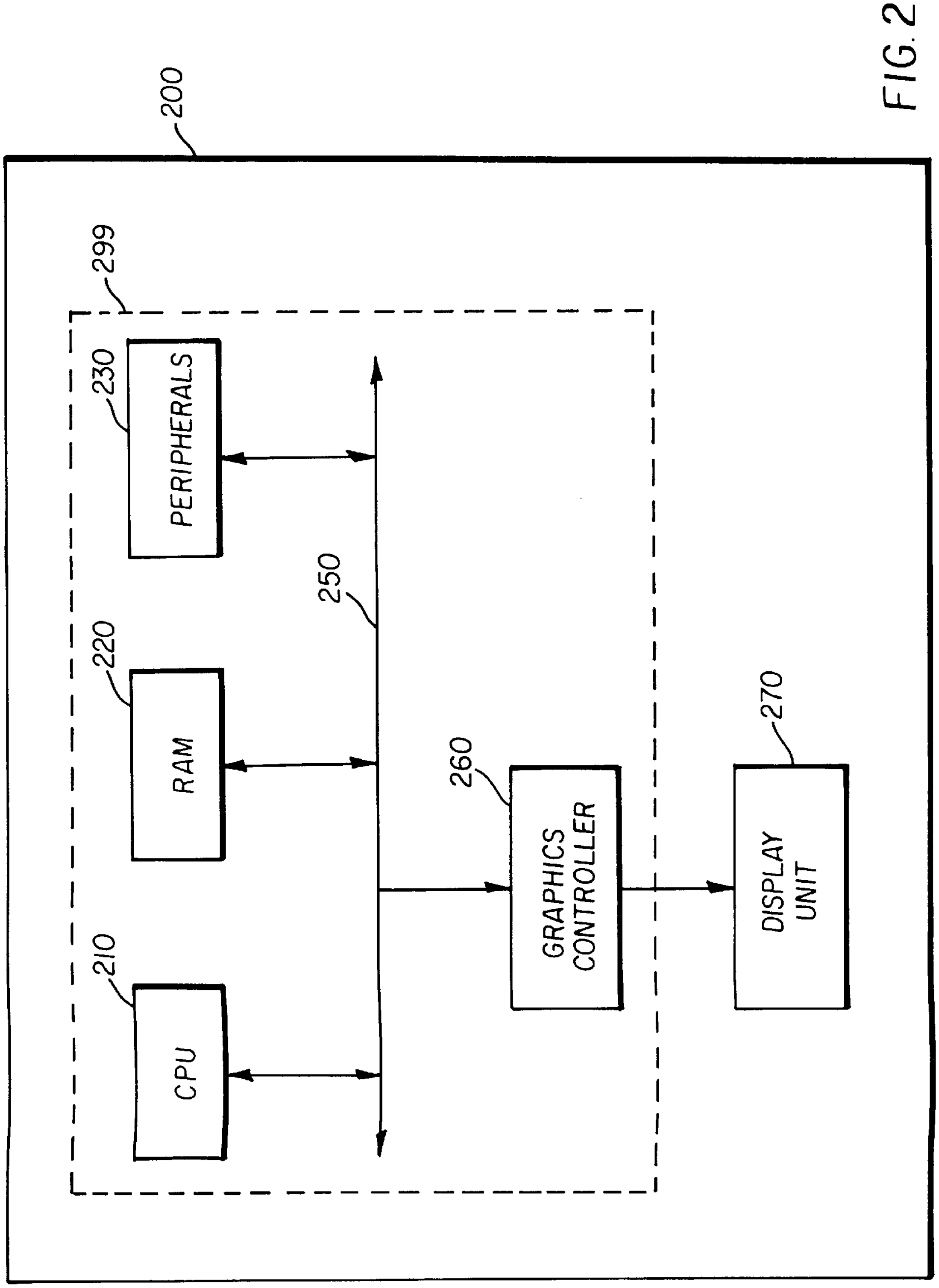
FIG. 2 is a block diagram of an example computer system in which the present invention can be implemented.

FIG. 2 is a block diagram of computer system 200 in which the present invention can be implemented. Computer system 200 includes central processing unit (CPU) 210, random access memory (RAM) 220, one or more peripherals 230, graphics controller 260, and display unit 270. CPU 210, RAM 220 and graphics controller 260 are typically packaged in a single unit, and such a unit is referred to as graphics source 299 as the image data is generated by the unit. All the components in graphics source 299 of computer system 200 communicate over bus 250, which can in reality include several physical buses connected by appropriate interfaces.

RAM 220 stores data representing commands and possibly pixel data representing an image. CPU 210 executes commands stored in RAM 220, and causes different commands and pixel data to be transferred to graphics controller 260. Peripherals 230 can include storage components such as hard-drives or removable drives (e.g., floppy-drives). Peripherals 230 can be used to store commands and/or data which enable computer system 200 to operate in accordance with the present invention. By executing the stored commands, CPU 210 provides the electrical and control signals to coordinate and control the operation of various components.

Graphics controller 260 receives data/commands from CPU 210, generates an analog signal and a corresponding reference signal(s), and provides both to display unit 270. The analog signal can be generated, for example, based on pixel data received from CPU 210 or from an external encoder (not shown). Alternatively, graphics controller 260 can generate pixel data representative of a new image based on commands received, for example, from CPU 210. Graphics controller 260 then generates an analog signal based on such pixel data. In one embodiment, the analog signal is in the form of RGB signals and the reference signal includes the VSYNC and HSYNC signals well known in the art and explained in detail below. However, it should be understood that the present invention can be implemented with analog image data and/or reference signals in other standards. Examples of such standards include composite sync standard usually implemented on Macintosh Computer Systems and Sync on Green standard.

Display unit 270 receives the analog signal from graphics controller 260 and generates the display signals. The display signals cause an image to be generated on a display screen usually provided within display unit 270. For an accurate reproduction of the image encoded in the analog signal, display unit 270 may need to determine the display signal parameters accurately. As explained above, determination of some display signal parameters may be problematic. Accordingly, the present invention enables accurate and automatic determination of such display signal parameters, as will be explained with reference to FIG. 3 below.

3. The Method of the Present Invention

Figure 3:
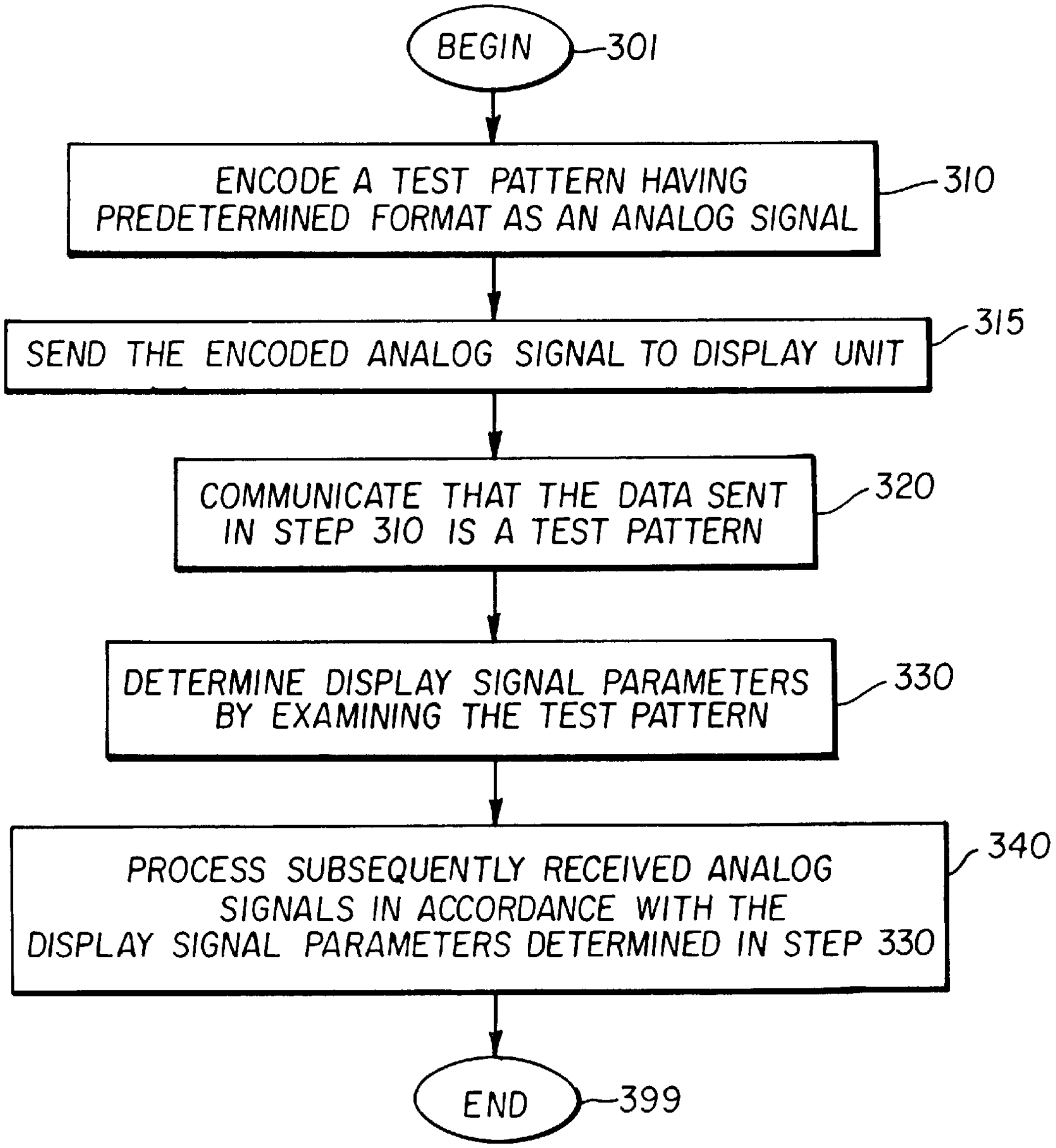
FIG. 3 is a flowchart illustrating the steps performed which enable a display unit to determine display signal parameters automatically in accordance with the present invention.

FIG. 3 is a flowchart illustrating the steps performed in accordance with the present invention. The steps will be explained with reference to the example computer system 200 of FIG. 2. In step 310 of FIG. 3, graphics controller 260 encodes in an analog signal a test pattern having a predetermined format. A format typically specifies the convention according to which information will be represented and communicated in a data stream. An example format will be explained below with reference to FIG. 4.

In step 315, graphics controller 260 sends the analog signal to display unit 270. Graphics controller 260 can use the same communication path (e.g., bus 150) for sending both the analog signal with the encoded test pattern and the analog signal with a image encoded. The data representing such images is termed as display data. Accordingly, it is necessary for the graphics controller 260 to communicate to display unit 270 that a test pattern has been sent in step 315.

Thus, in step 320, graphics controller 260 provides an indication to display unit 270 that the analog signal sent in step 315 includes a test pattern. In the example implementations described below, the indication is express. That is, an encoding scheme is chosen which can be used to confirm that a test pattern is encoded in the received analog signal. However, other schemes may be used to indicate the presence of a test pattern in an analog signal as will be apparent one skilled in the art by reading the description provided herein. For example, a computer system may be implemented to send a test pattern during the power-up (booting period) sequence and display unit 270 may be implemented to operate cooperatively. Thus, any scheme which communicates (either express or implied) can be chosen to send a test pattern to display unit 270. Even though step 320 is explained as following steps 310 and 315, it should be understood that the sequence in which these steps are performed can be varied without departing from the scope and spirit of the present invention. Thus, in one embodiment described below, an encoding scheme is chosen using which the encoded data itself communicates that it is a test pattern. In an alternative embodiment, a pattern may be sent first which indicates that the data to follow can be used for determining the parameters. Other variations will be apparent to one skilled in the relevant arts by reading the description herein.

In step 330, display unit 270 receives the encoded digital signal and determines the display signal parameters by examining the test pattern. In the process, display unit 170 first ensures that the data encoded includes the test pattern as will be explained below with reference to an example embodiment. The process of determination can include measuring parameters based on the test pattern or receiving display signal parameter values encoded in the data. Both determination schemes will be illustrated with examples below.

After determining the display signal parameters, display unit 270 may store the parameter values for later usage. In step 340, display unit 270 uses the determined display signal parameters in processing subsequently received analog signals in generating the display signal. As subsequent displays are based on the determined display signal parameters, images encoded in analog signals may be accurately reproduced and displayed on a display screen.

The present invention will be explained in detail below with specific examples. In the description there, display unit 170 will be assumed to be a digital monitor (e.g., flat-panel monitor). Further, computer system 200 will be assumed to operate in accordance with SVGA industry standard. However, it should be understood that the present invention can be implemented in other types of hardware (e.g., CRT based monitors) or standards without departing from the scope and spirit of the present invention. Also, the description below is provided with reference to a single communication path (channel) transferring data for a single color. However, it should be understood the present invention can be implemented using multiple channels also without departing from the scope and spirit of the present invention as will be apparent to one skilled in the relevant arts by reading the description here.

Thus, first some display signal parameters in the SVGA standard will be explained first. An example manner in which graphics source 299 encodes a display signal with a test pattern will then be explained. Finally, an embodiment of display unit 270 which determines display signal parameters from the encoded display signal will be explained.

4. Display Signal Parameters in an Example Graphics Environment

Figure 1B:
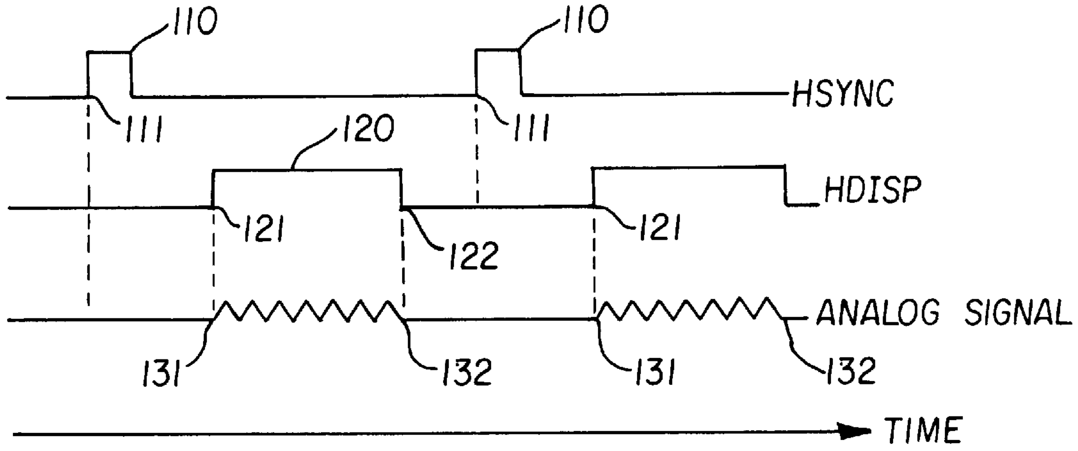
Figure 1C:
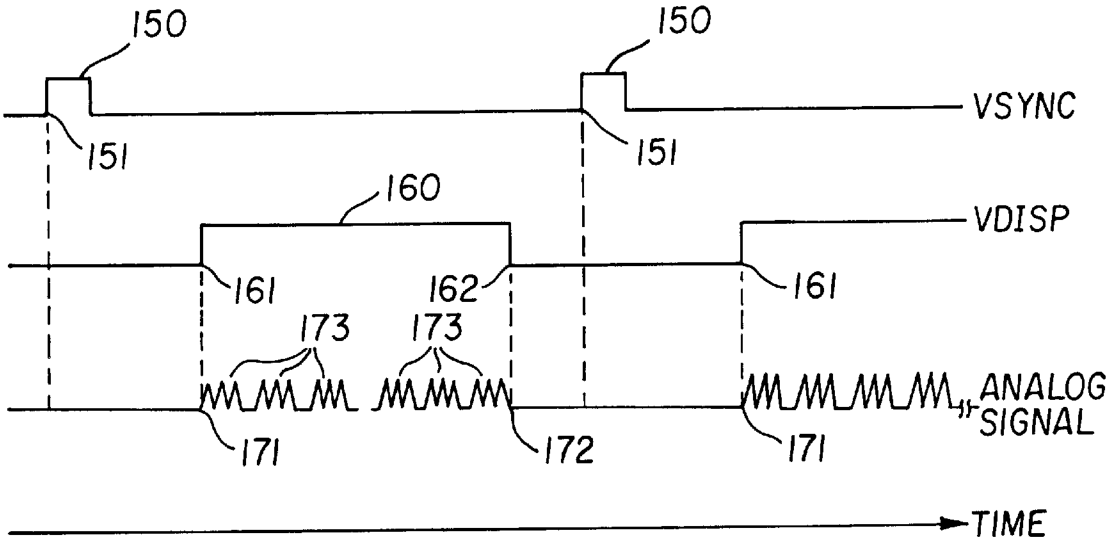

FIGS. 1A, 1B, and 1C together illustrate some of the timing parameters according to SVGA terminology. FIG. 1A is a view of image 100 and the timing signals HSYNC, VSYNC, HDISP and VDISP. These timing signals are generated by graphics controller 260 in generating an analog signal representative of image 100 within graphics source 299. Image 100 may itself be represented as digital data such as pixel data elements in RGB 8:8:8 format. Only that portion of SVGA standard as is believed to be applicable to the present invention is explained here. For a detailed explanation, the reader is referred to PS-2 Technical Reference Manuals available from International Business Machines Corporation (IBM), USA, which is incorporated herein by reference in its entirety.

FIG. 1C illustrates an analog signal representing an entire frame and the associated timing signals. Each of portions 173 represents a horizontal line, which is described in further detail with reference to FIG. 1B.

With reference to FIGS. 1A and 1B, pulse 110 in HSYNC signal indicates a transition to a next horizontal line. In FIG. 1A, only one pulse is shown, but in reality several pulses are generated to indicate a transition to the next horizontal line as shown in FIG. 1B. A high signal level on HDISP signal indicates that the analog signal is encoded with image data at a corresponding time. When HDISP returns to low signal level, it indicates the end of the horizontal line display. Thus, from point 131 (or 121) through 132, analog signal represents a horizontal line of an image. Points 131 and 132 are termed as horizontal start position and horizontal end position respectively. Beginning 111 of pulse 110 can be used as a reference in measuring the delay of these points relative to point 111.

The delay between horizontal reference point (111) and horizontal start position (131) is referred to as horizontal start delay time (in SVGA environment, this corresponds to back porch). The time delay from (immediately preceding) point 111 to 132 is referred to as horizontal end delay time. The time delay from point 132 to 111 is referred to front porch. The total time duration of front porch and back porch represents the horizontal retrace time. The signal from point 131 to a subsequent point 132 represents active display portion of an image.

With reference to FIGS. 1A and 1C, pulse 150 on VSYNC signal indicates a transition to a next frame of display. A high level 160 on VDISP signal generally indicates that horizontal lines with valid display data are being transmitted to display unit 20. Thus, point 161 refers to a time when analog signal corresponding to the first pixel is generated and transmitted to display unit 270. Beginning 151 of pulse 150 can be used a reference point to measure the vertical delay times. The time delay from beginning 151 to points 171 and 172 refers to vertical start delay time and vertical end delay times respectively.

The signal between two VSYNC pulses 150 represents a frame. Accordingly, the analog signal received between two VSYNC pulses 150 is referred to as a analog signal frame. Each analog signal frame represents a frame of display.

Unfortunately, in the SVGA environment, the VDISP and HDISP signals are not transmitted to display unit 270. Only analog data signal and HSYNC, VSYNC signals are available to display unit 270. From these two synchronization signals, display unit 270 may need to reconstruct image 100.

Such reconstruction requires at least two tasks in digital display environments—one to recover a sampling clock, and secondly to determine the start/end positions (131, 132, 171, 172). An example scheme for recovering the clock is described in co-pending U.S. Patent Application entitled, "A Method and Apparatus for Clock Recovery in a Digital Display Unit", Filed Feb. 24, 1997, having Ser. No. 08/803, 824 and Attorney Docket Number: PRDN-0002, which is incorporated in its entirety herewith.

The manner in which the second task of determining the start and end positions can be performed in one embodiment will be explained in further detail below. The steps to be performed for such a determination has been explained with reference to FIG. 2 above. One of the steps explained there was communicating to display unit 270 that a test pattern has been (or is or will be) sent. One scheme for such a communication will be explained now.

Figure 4:
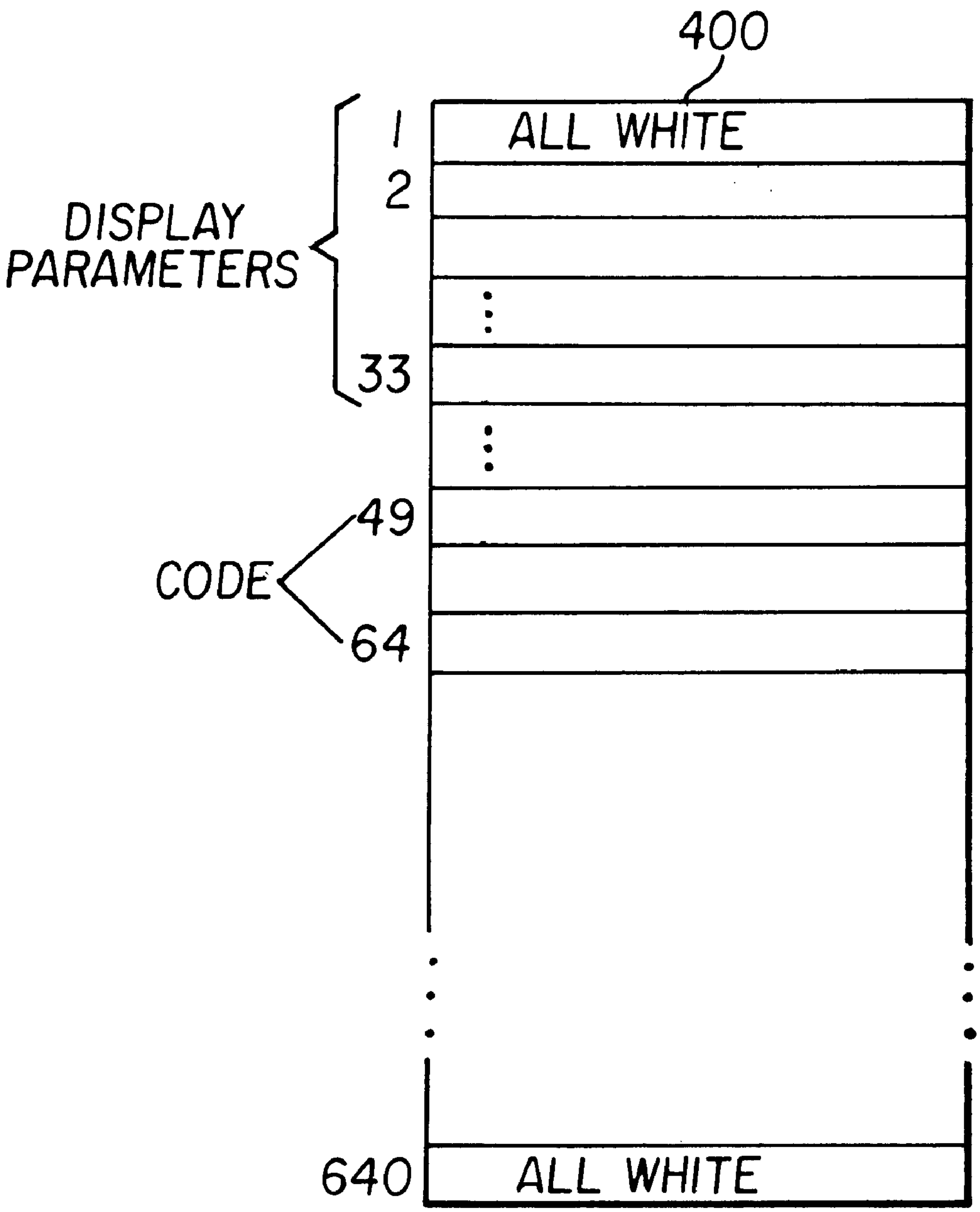
FIG. 4 is a diagram illustrating an example frame format used to indicate to a display unit that a test pattern is encoded in the received analog signal.

5. An Example Scheme Enabling Display Unit to Determine Various Display Signal Parameters FIG. 4 is a diagram illustrating the manner in which graphics controller 260 can encode data of a predetermined format in an analog signal. Only the first 64 lines and the last line of the 640 lines of frame 400 are used in this example illustration. Other modes of representation will be apparent to one skilled in the art by reading the description provided herein. For each line, the content according to this example encoding scheme, and the purposes that can be served by that content will be explained below.

As to lines 1 and 640, all points are noted as being encoded with data representing white color. As the entire lines have a voltage level representing complete brightness, display unit 270 can determine the voltage level which is being used by graphics controller 260 to represent complete brightness. In addition, as the start position of line 1 includes a white value, display unit 270 can measure the horizontal start delay time and the vertical start delay time, and can thus determine the horizontal start position and vertical start position. Similarly, display unit can determine horizontal end position from the last position of line 1, and the vertical end position from the last position of line 640. It should be noted that for determining the timing parameters, it may be sufficient that the entire first and last lines (or the first and last points) be encoded with a color value greater than a predetermined threshold.

Lines 2–33 are used to encode other display signal parameter values which may be available only in graphics source 299. These type of parameters can be ascertained on graphics source 299, and sent to display unit 270. For example, in a digital display unit, it is helpful to know the total number of pixels (HTOTAL) in each horizontal line of an image representation on graphics source 299. In one embodiment, HTOTAL may can be equal to horizontal period Th divided by the dot clock frequency on graphics source 299. The digital display unit can accordingly coordinate the sampling frequency for an accurate recovery of an image represented by an analog signal. The sampled image can be upscaled or downscaled to fit the display unit screen. An alternative embodiment for determining the sampling frequency is explained in detail in co-pending Patent Application entitled, "A Method and Apparatus Implemented in a Computer System for Determining the Frequency Used by a Graphics Source for Generating an Analog Display Signal", Serial Number: UNASSIGNED, Filed Concurrently herewith and having Attorney Docket Number: PRDS-0005.

It is further useful to know the number of colors used by graphics source 299 to represent an image. With this information, the same number of clear colors can be provided on display unit side. For example, if a graphics source uses 256 colors to represent each pixel of an image, the image can be accurately reproduced without regard to some level of deviations in analog representation if display unit 270 also samples each point using 8-bit encoding.

These display signal parameters can be ascertained at the graphics source according to well-known interfaces to the corresponding operating system. For example, in a IBM-PC compatible environment, a 'BIOS' call can be used for determining the parameters. Such display signals can be encoded in one or more lines of frame 400 in one of several known ways as will be apparent to one skilled in the relevant arts by reading the description provided herein.

In an example encoding scheme, only one bit is encoded in each horizontal line. This is because, display unit 270 may not have the clock to accurately sample multiple positions within a horizontal line. However, HSYNC signal can serve to indicate a transition to a next horizontal line. One of several schemes can be used to encode one bit of data per line as will be explained below. However, different schemes of encoding which can allow a different number of bits can be implemented as will be apparent to one skilled in the art by reading the description provided herein.

In a first embodiment, to represent a value of 1 in a horizontal line, the entire line is encoded with white color. A zero value is represented by encoding the whole line with a black color. In a first alternative embodiment, zero value is represented by encoding the whole line with black color. However, a logical value of one is represented by mixing black and white pixels in a predetermined sequence and ratio. For example, K white pixels may be sent first, followed by L black pixels, which are then followed by N white pixels, where K, L and N are predetermined integers. As will be appreciated, such a mixing ensures that black and white pixels are available in frame 400, which facilitates the determination of voltage levels used in encoding black and white colors at display unit. In yet another alternative embodiment, the frequency of changes from black to white can be used to encode 0 and 1 values. For example, a high frequency can indicate a logical value of 1, and low value will indicate a logical value of 0.

In the rest of the description, it will be assumed that a logical value of 1 is encoded using white color in a complete horizontal line and a logical value of 0 is encoded using black color in an entire horizontal line. Thus, display unit 270 needs to only determine whether a line is encoded above or below an intermediate color threshold. In a scheme where display unit 270 samples the analog signal encoding the test data, only the most significant bit (MSB) of one of the sampled values needs to be examined to determine whether the horizontal line is encoded with 0 or 1 value as will be explained below in further detail with reference to FIG. 5.

The analog signal carrying the encoded data is sent over the same communication path as that over which normal image display data is sent. Therefore, there needs to be a mechanism for graphics source 299 to indicate to display unit 270 that an analog signal frame includes test data that can be used for the determination of display signal parameters. Accordingly, display unit 270 can automatically determine that analog signal encoding frame 400 represents a test pattern with the predetermined format.

Thus, lines 49–63 are used to encode a code value (hereafter referred to as code word 499) which serves to identify whether an analog display signal frame represents normal display signal or test data with a predetermined format which can be used for determining analog signal parameters. For reasons explained above, only one bit may be encoded in each horizontal line.

In this example scheme, lines 34–48 may be used for filler data. However, at least one of the points (pixels) in lines 2–480 is ensured to have black color so that the voltage level used to encode black color can be ascertained in display unit 270. It should be understood that the detection of presence of a test pattern is generally more accurate with more bits in test code (or code value) 499. As typical graphics controller standards include at least 200 lines per frame, more lines can be used to communicate additional information and to have code value 499 with more number of bits. The manner in which code value 499 communicates the presence of a test pattern in an analog signal frame will be explained below.

6. An Example Scheme for Communicating the Presence of a Test Pattern Having a Predetermined Pattern As noted earlier, an indication that data encoded in a frame comprises test data is sent to display unit 270. Several schemes can be used to send such an indication as will be apparent to one skilled in the relevant arts by reading the description provided herein. In the example implementation described herein, well-known CRC techniques commonly used for error correction and detection are employed. The CRC techniques employed will be described briefly here. However, for a more detailed description, the reader is referred to, "Error-Correcting Codes", 2nd Edition, MIT Press, Cambridge, Mass. 1972, by W. W. Peterson and E. J. Weldon, which is incorporated herein by reference in its entirety.

Broadly, a CRC code is generated on graphics source 299 by dividing the data to be sent with a predetermined generating polynomial. The remainder is adjusted to generate code word 499. The code word is generated to have a value such that a predetermined syndrome will be generated when the test data (including the code word) is processed by a CRC syndrome generator in display unit 270.

There can be more than one predetermined syndromes, with each predetermined syndrome potentially being designed to provide different information. For example, a first predetermined syndrome may indicate that subsequent display signal frames will have test patterns. A subsequent frame may be encoded with a different syndrome to indicate the actual test data which lends to the determination of display signal parameters. However, in the description below, test data and indication of the presence of test data are described as being encoded within a single frame.

Thus, digital data frame 400 (including test data and code word) is encoded as an analog signal frame and the analog signal frame including the test data is transferred to display unit 270. The data encoded in analog signal frame is decoded and processed in a CRC generator in display unit 270. When the CRC generator in display unit 270 generates that predetermined syndrome, display unit 270 can determine that test data (with predetermined format) has been sent. Display unit 270 can then determine the display signal parameters.

Typically, code word 499 is generated by executing a series of software instructions on graphics source. However, in display unit 270, due to the timing constraints, a hardware circuit may be employed to determine whether a predetermined syndrome will be generated. The software scheme and an example hardware circuit will be explained below with examples. The examples will be described in terms of four bits of data being transmitted with three bits of code word. However, it should be understood that in reality much longer code words are preferably employed to avoid the possibility of false determinations of presence of test data by display unit 270. For example, display unit 270 will be described below as including a 16-bit code word.

In the example description here, it will be assumed that data to be transmitted is 1010, the predetermined generating polynomial is $X^3+X^1+1$ and a predetermined syndrome is 111. To generate the codeword which causes the predetermined syndrome to be generated, the data to be transmitted 1010 is first padded with three zeros to the right to generate 1010000. This number 1010000 is divided by the generating polynomial (1011) to generate a remainder of 011. As is well known in the art, to cause a predetermined syndrome to be generated at the receiving end, the desired syndrome is added modulo 2 to the remainder. Thus, assuming 111 is a desired syndrome, 100(resulting from module 2 addition of 011 and 111) is added as a code word. Thus, the test data transmitted will be 1010100, wherein the last three digits are the generated code word. The test data is encoded as an analog signal and transmitted to display unit 270.

Display unit 270 receives the analog signal, decodes the digital data encoded in the analog signal, and processes the decoded data through a CRC syndrome generator circuit. If the resulting syndrome equals a predetermined expected syndrome value, display unit 270 can determine or conclude that the decoded data represents a test pattern with a predetermined format, and the received analog signal (and encoded data) can be used for determining signal parameters. An 3-bit CRC syndrome generator circuit will be explained below with reference to an implementation of display unit.

7. Example Embodiment of Display Unit

In one embodiment, display unit 270 is implemented as a digital display unit. Digital display units are generally characterized by discrete points (called pixels) on a display screen. Pixels are typically activated individually to generate an image. Digital display unit 170 can be in the form of a flat-panel monitor used in lap-top (note-book computers), a flat-monitor used in desk-top computers and workstations, among other forms. Even though the example implementation is described with reference to a digital display unit, it should be understood that the present invention can be implemented using analog technologies (e.g., using a CRT monitor). Such implementations will be apparent to one skilled in the relevant arts by reading the description herein.

Figure 5:
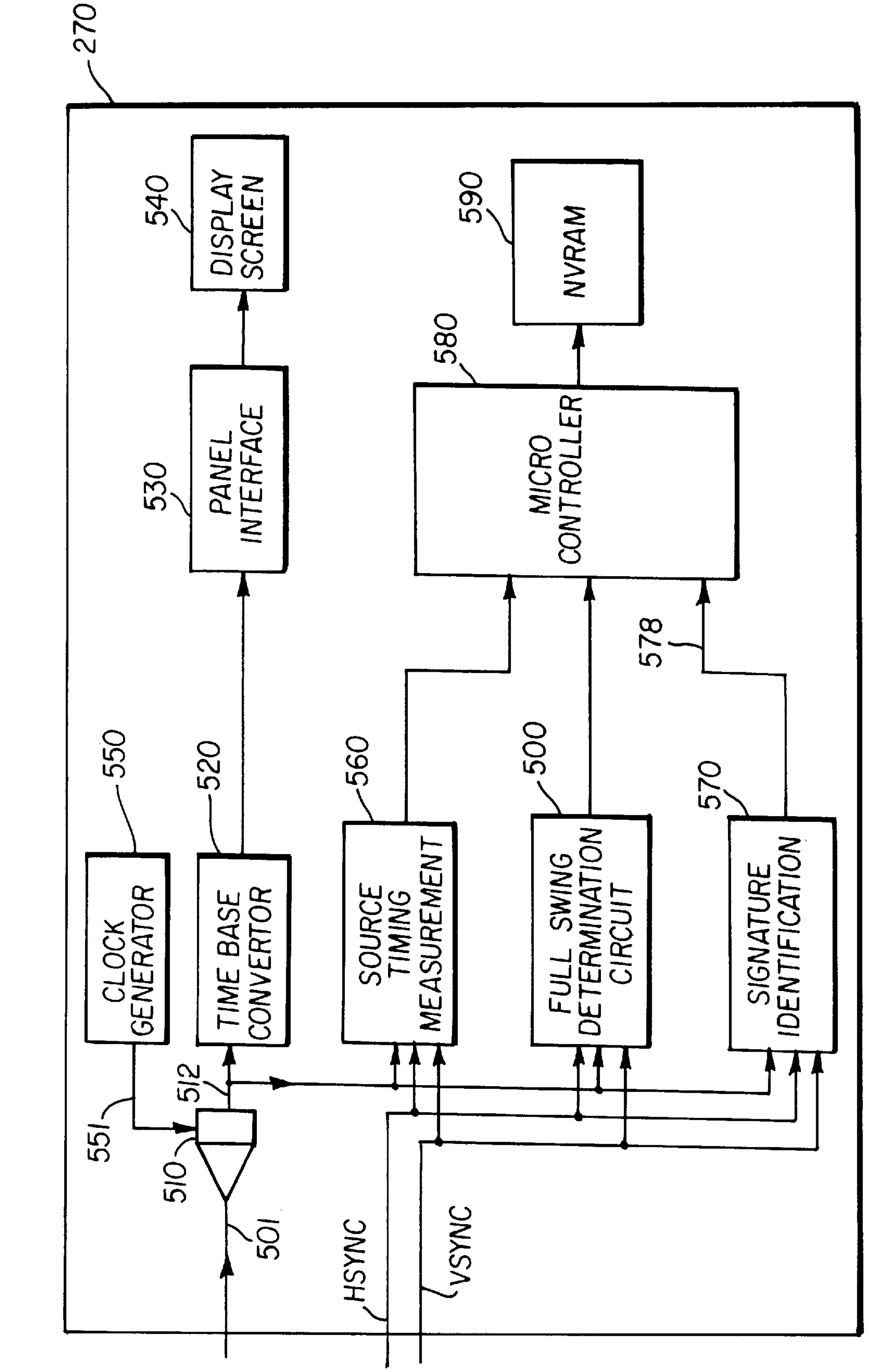
FIG. 5 is a block diagram of an embodiment of a display unit of the present invention.

FIG. 5 is a block diagram of display unit 270 including full swing determination circuit 500, analog-to-digital converter (ADC) 510, time base convertor (TBC) 520, panel interface 530, clock generator circuit 550, digital display screen 540, source timing measurement (STM) circuit 560, signature identification block 570, micro controller 580 and non-volatile memory 590. Each of these components will be explained in further detail below.

Clock generator 550 recovers a clock signal, which is used by ADC 510 for sampling the analog signal received on line 501. An embodiment of clock generator is explained in co-pending patent application entitled, "A Method and Apparatus for Clock Recovery in a Digital Display Unit", Filed Feb. 24, 1997, having Ser. No. 08/803,824 and Attorney Docket Number: PRDN-0002.

ADC 510 samples the analog signal received on line 501 according to sampling clock 551 received from clock generator 550. The analog signal received on line 501 can either represent a test data frame 400 or normal display signal frame. The sampled data values are provided on line 512 to TBC 520 and source timing measurement block 560. Time base converter 520 upscales or downscales the source image represented by analog signal if necessary. An embodiment for upscaling is described in co-pending patent application entitled, "A Method and Apparatus for Upscaling an Image", Filed Feb. 24, 1997, having Ser. No. 08/804,623 and Attorney Docket Number: PRDN-0001.

Source timing measurement (STM) circuit 560 receives as input the synchronization signals (HSYNC and VSYNC)

and the sampled values. The sampled values are received from ADC 510 on line 512. By examining these inputs, STM circuit 560 can determine the timing parameters (explained with reference to FIGS. 1A and 1B above). For example, STM circuit 560 can determine the time delay between the beginning of a HSYNC pulse and the reception of the first white pixel. As the first bit of a frame of a test pattern corresponds to the horizontal start position of the analog signal received on line 591 according the description with reference to FIG. 4 above, the time delay represents the duration between the reference (point 111 of FIG. B) and the horizontal start position. Using the time delay representing the horizontal start position, all the subsequent horizontal lines can be accurately sampled from the horizontal start position.

The horizontal end position can also be similarly determined by measuring the time delay between a reference point and the last white pixel of the first horizontal line in a test frame. The vertical positions also can be determined similarly. The time delays described here can be measured in clock cycles/ticks for horizontal parameters and in terms of number of horizontal lines for vertical parameters. In one embodiment, STM circuit 560 determines a change in graphics mode based on a change in the timing parameters, and indicates the change to microcontroller 580. For example, if a user changes a desired screen resolution, the timing parameters of the received analog signal will be changed. Based on the description provided herein, it will be apparent to one skilled in the relevant arts how to implement several embodiments of STM circuit 560.

Full swing determination circuit 500 determines the voltage levels used to represent maximum and minimum brightness levels for each color. The determination is used to adjust the configuration of ADC 510 so that the full quantization range is used to represent the voltage levels received from graphics source 299. An example implementation of full swing determination circuit 500 and the manner in which the determinations are used in configuring ADC 510 will be explained in detail below.

In one embodiment, full swing determination circuit and source timing measurement circuit 560 measure the respective parameters for each frame. When signature identification block 570 determines that a frame represents a test pattern, micro controller 580 accepts the measured values as being signal parameter values that can be used for reproducing images encoded in subsequently received analog signal frames.

Signature identification block 570 receives sampled values and determines whether data encoded in a frame represents test data. Signature identification block 570 needs to be implemented according to the scheme chosen to indicate the presence of a test pattern at graphics source 299. In the example scheme based on CRC techniques described above, signature identification block 570 uses code word 499 to determine the presence of test pattern in the received analog signal frame. An example embodiment for making such a determination will be explained in detail below. Signature identification block 570 asserts a signal on update line 578 when it determines that a test pattern is received.

Micro-controller 580 receives on update line 578 from signature identification block 570 an indication of reception of a test pattern. Micro-controller 580 then retrieves the signal parameters determined by various components and stores them in non-volatile memory 590. Thus, micro-controller 580 receives the timing parameters from source timing measurement (STM) circuit 570. The voltage swing parameters are received from full swing determination circuit 500 as will be described below. Micro-controller 580 stores all the received parameters in non-volatile memory 590.

Non-volatile memory 590 can be used to store several sets of parameters, with each parameter set corresponding to a mode of operation. For example, one set may be stored for one graphics mode (SVGA) and another set may be stored for SVGA mode. In one embodiment, non-volatile memory 590 is implemented using an EEPROM.

Once stored, these sets of values may be retrieved and used by micro-controller 580 in controlling the image reproduction operations. Thus, micro-controller 580 can cause clock generator 550 to generate clock signals for subsequent horizontal lines based on a start time determined from a test patter. The manner in which such control can be accomplished will be apparent to one skilled in the relevant arts.

Thus, micro-controller 580 determines the presence of a test pattern having a predetermined format based on a signal asserted by signature identification block 570. The manner in which signature identification block 570 makes such a determination in one implementation of the present invention will be explained in detail below.

8. Example Implementation of Signature Identification Block

As noted above, the implementation of signature identification block needs to be consistent with the implementation on graphics source for a proper determination of the presence of test pattern. Several schemes will be apparent to one skilled in the relevant arts by reading the description provided herein. In this section, an implementation which operates in conjunction with the format and scheme explained with reference to FIG. 4 will be described below.

Figure 6:
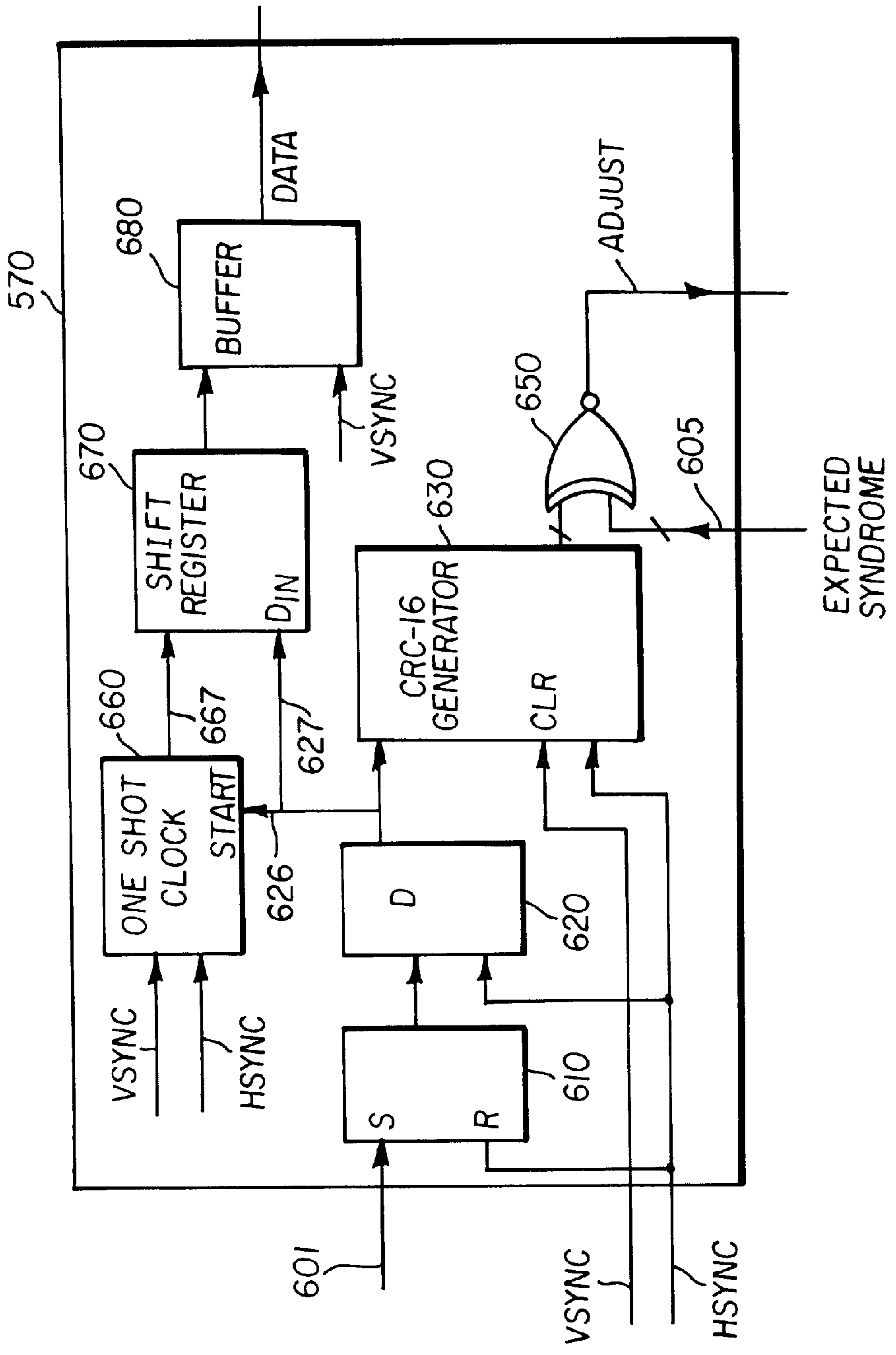
FIG. 6 is a block diagram of an embodiment of signature identification block illustrating the components therein.

FIG. 6 is a block diagram of an example implementation of signature identification block 570 including flip-flop 610, delay element 620, CRC generator 630, XNOR gate 650, one-shot circuit 660, shift register 660, and buffer 680. HSYNC signal provides a clock signal to each of these components. Broadly, CRC syndrome generator 630 and XNOR gate 650 together generate a signal indicative of whether a test pattern has been received. One-shot 660, shift register 670 and buffer 670 together operate to store the bits encoded in the predetermined horizontal lines, which store the signal parameter values (e.g., lines 2–33 in FIG. 4).

S-R flip-flop 610 receives the most significant bit of output of ADC on line 601. Flip-flop 610 is cleared by HSYNC signal. Thus, flip-flop 610 receives a 1 or 0 depending on whether a horizontal line was encoded with white or black color respectively. Delay element 620 is clocked by HSYNC and operates to store the data bit received during a previous horizontal line.

CRC generator 630 sequentially receives each of the 63 bits of data (shown in lines 2–64 of FIG. 4) from delay element 620 and generates a syndrome value, which is used to determine whether a test pattern is encoded in a received signal frame. As already noted, the determination is generally more reliable with more number of bits in the generated code value 499 or syndrome. Thus, CRC generator 630, is implemented to generate a 16-bit syndrome. This length is consistent with the 16 bits of test code 499 encoded in frame 400 described above. However, for simplicity, examples of CRC code generation and syndrome generation will be explained with a length of only 3-bits as also noted above.

VSYNC pulse resets the state of CRC generator 630 and HSYNC pulse causes the data to be processed and shifted to a next stage. The output of CRC generator 630 includes all the bits of the computed syndrome. XNOR gate 650 performs a logical XNOR operation of the computed syndrom with an expected syndrome received on line 605. The expected syndrome value can be received from a programmable register. As already explained, each of the expected syndrome values can be used to communicate a different message.

A logical value of 1 (for each bit) on the output of XNOR gate 650 indicates CRC syndrome generator 630 has generated a value equal to the desired syndrome received on line 605. For one of such desired syndrome values, display unit 270 determines that a test pattern is received. In response to such an indication, micro-controller 580 receives the parameter values measured by source timing measurement circuit 560, voltage swing parameters available from full swing determination circuit 500 and the other display parameters sent from the graphics source. These other display parameters will be available in buffer 680 as will be explained below.

In the description above, the presence of a test pattern is determined based on data received in one display signal frame. One problem with such a determination is that some sequences of non-test data (normal user data) can cause erroneous determination of presence of test data pattern. To avoid such erroneous determinations, in one alternative embodiment, the determination of presence of test pattern is based on multiple consecutively received frames. According to one convention, such consecutively received frames should return a predetermined sequence of syndrome values. For simplicity and clarity, it will hereafter be assumed that the determination of the presence of test frame is based on a single frame (i.e., by XNOR gate). More complex, but reliable, schemes will be apparent to one skilled in the relevant arts by reading the description provided herein.

One-shot circuit 660 generates a capture signal (logical level 1) on line 667 for a duration on M clock cycles after receiving a first logical 1 value on line 626. HSYNC signal provides the clock signal and VSYNC prepares one-shot circuit 660 to wait for the first logical 1 value on line 626. As the first line in test pattern is encoded with a white color (see FIG. 4 and explanation of above), the first logical 1 value is received delayed by a time corresponding to the delay introduced by delay element 620. As the display signal parameters sent from host computer side are encoded from the second line only, the first bit may be ignored. Accordingly, the first logical value of 1 is provided on line 626 to START input with a delay of one clock cycle.

Figure 8:
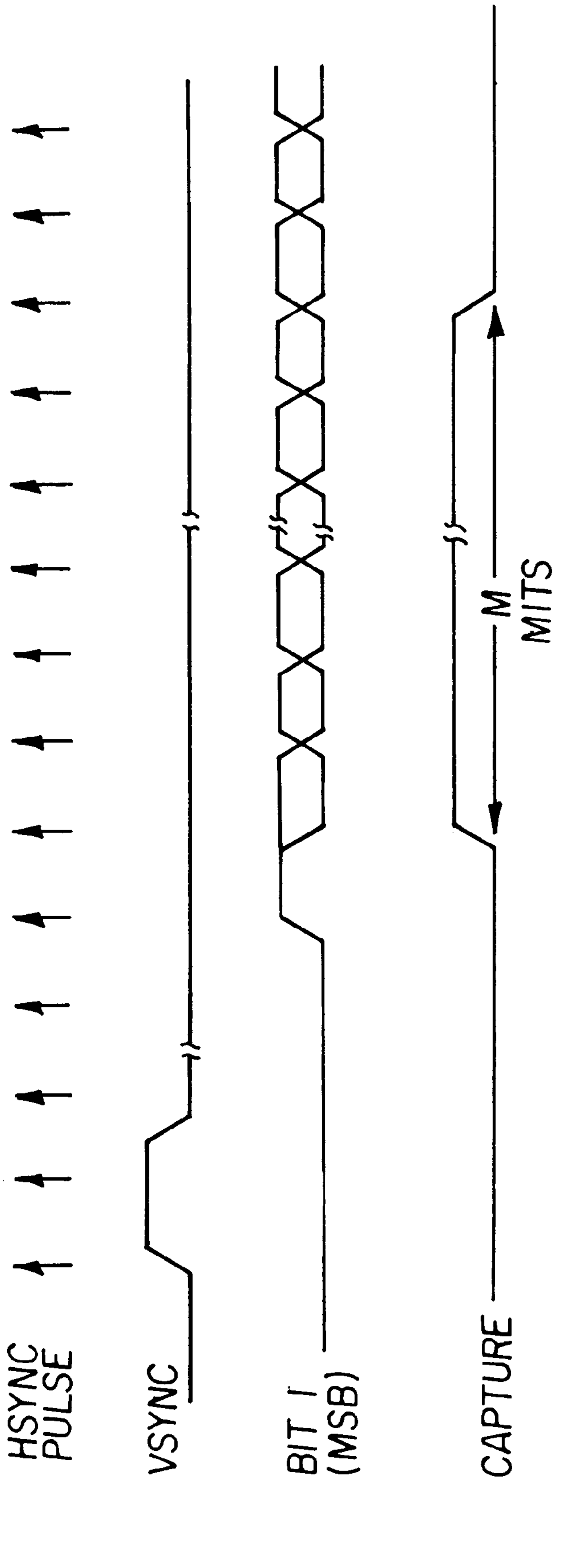
FIG. 8 includes timing diagrams illustrating the operation of a one-shot clock circuit included in the signature identification block.

In addition, the value of M corresponds to the number of lines storing display signal parameters in frame 400. In the example explained there with reference to FIG. 4, M=32. That is, 32 bits of data representing display signal parameter values are encoded in frame 400. Thus, one-short circuit 660 generates a capture signal on line 667 for a duration equaling 32 clock cycles (HSYNC pulses). One of several circuits available in the market place can be used for one-shot circuit 660. FIG. 8 includes timing diagrams which further illustrate the operation of one-shot circuit 660. Capture signal is shown transitioning to a logical high level one HSYNC pulse after a first logical level 1 is received on line 626. The capture signal remains at a high logical level for M HSYNC pulses, enabling M bits to be captured in shift register 670.

Continuing the description with reference to FIG. 6, shift register 670 receives bits serially on line 627 and stores each received bit when the capture signal is asserted on line 667. Thus, shift register 670 stores the desired 32 bits in response to 32 successive HSYNC pulses. When VSYNC pulse is asserted, the M bits are transferred to buffer 680. Accordingly, micro-processor 580 can retrieve these display signal parameter values from buffer 680 after the end of the present frame of analog signal. Micro-computer 580 uses the parameters to reproduce (display) images in subsequently received analog signal frames.

Thus, signature identification block 570 asserts a signal indicating the presence of test data in a received analog signal and also provides the display signal parameters sent from graphics source 299. As explained earlier, CRC generator 630 detects the presence of test data in a received analog signal frame. The design and implementation of CRC syndrome generator 630 will be illustrated now with a circuit that generates a three bit syndrome value for simplicity.

9. An Embodiment of CRC Generator

Figure 7:
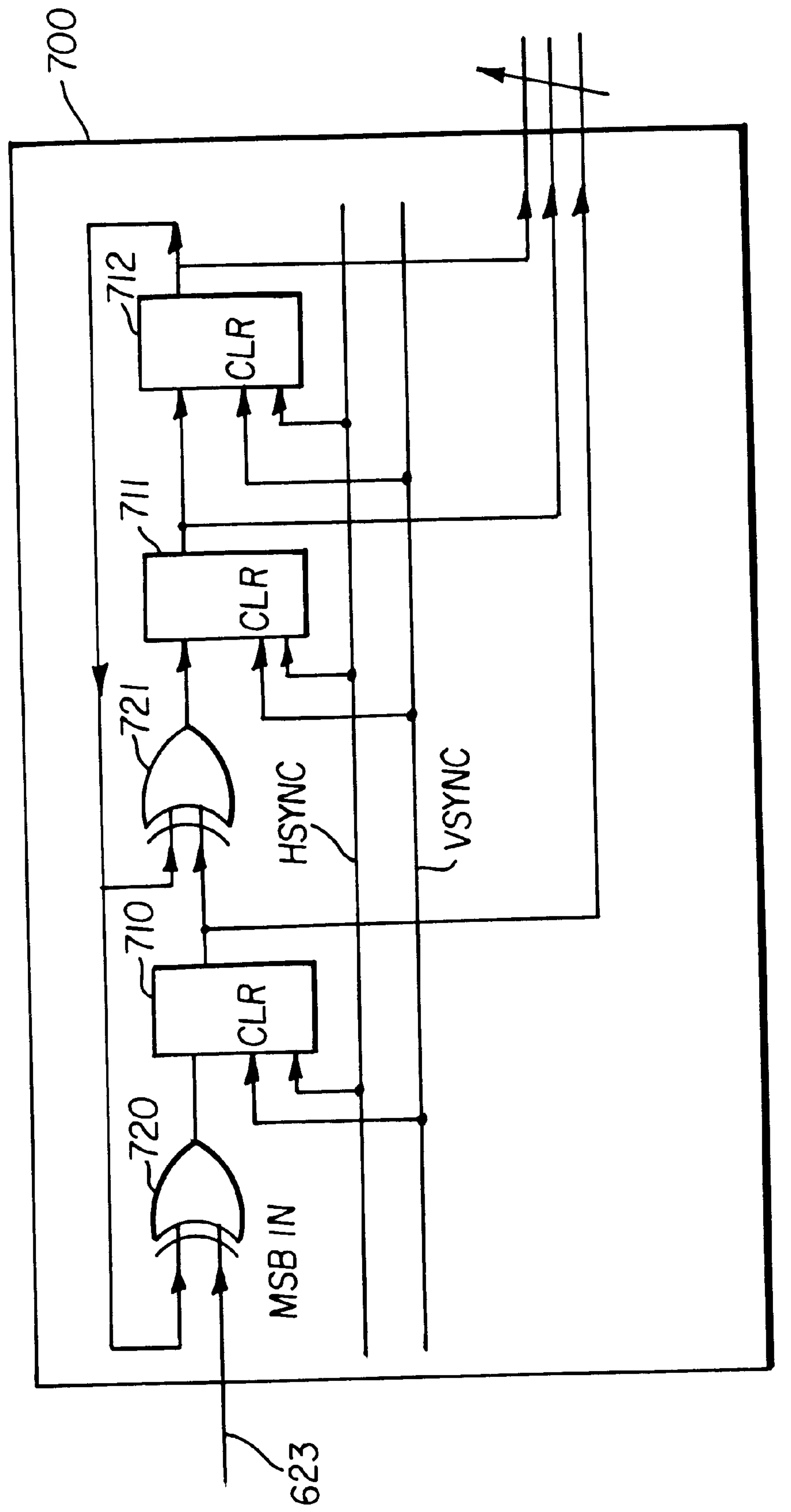
FIG. 7 is a block diagram of an example CRC generator implemented within signature identification block.

FIG. 7 is a block diagram of a CRC generator 700 for generating a three-bit syndrome which enables a determination as to whether the received data includes a test pattern. CRC generator 700 implements a division based on the predetermined generating polynomial $X^3+X^1+1$. CRC generator 700 includes delay elements 710, 711 and 712, $XOR^3$-gates 720, 721.

In operation, each bit of the received test pattern (first bit of lines 1–64 of FIG. 4) is fed sequentially on input line 623 XOR gate 720 during each clock cycle. As each bit of the test data is encoded in one horizontal line and as each horizontal line can be identified by a HSYNC pulse, each bit can be easily decoded. The bits are modified and/or propagated through XOR-gates 720, 721 and XOR gates 720, 721 in response to each HSYNC pulse. After all the bits are fed on input line 702, the outputs of delay elements 720, 721 and 722 will have the bits representing the syndrome value.

As already noted, the circuit for generating a three-bit syndrome is explained for illustration only. In practical applications, syndromes with many more bits should be employed to avoid false indications of presence of test data. The syndrome value generated according to the above design is provided as an input to XNOR gate 650 as described above to determine whether all bits are equal to one. If the generated syndrom equals the expected syndrome, an indication is provided to micro-computer 580 that a test pattern has been received.

10. An Embodiment of Full Swing Determination Circuit

Figure 9:
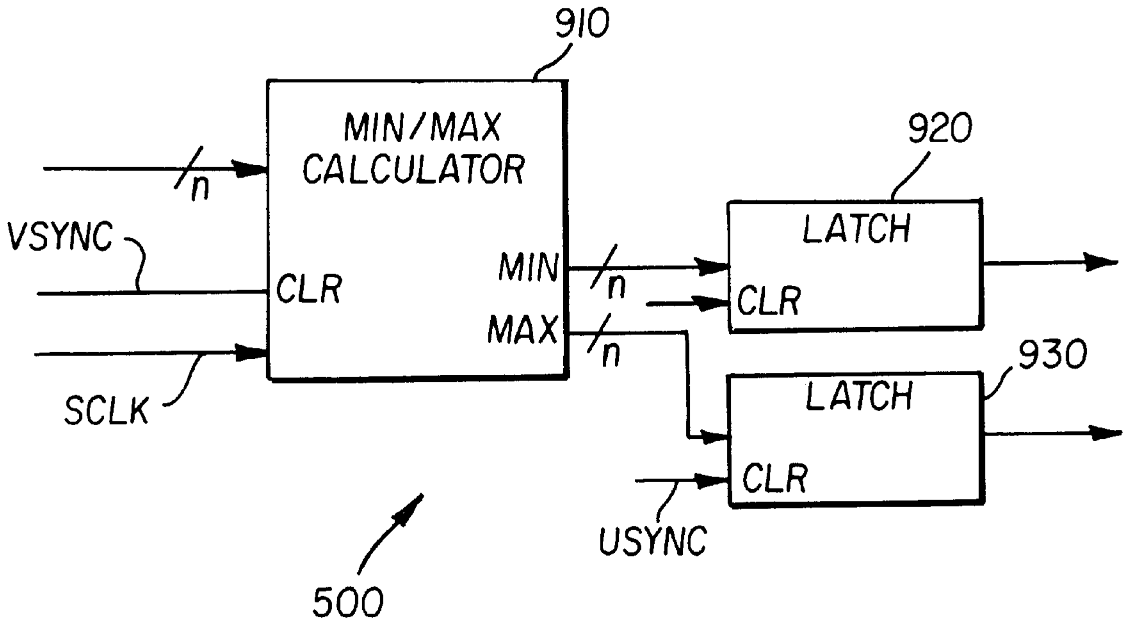
FIG. 9 is a block diagram illustrating the design and operation of a voltage swing determination circuit for determining the voltage swing parameters.

As explained above, the full swing determination circuit determines the voltage levels used to represent black and white pixels of an image. As the test data is designed to include at least one point each of black and white pixels, the voltage levels can be determined. FIG. 9 is a block diagram of an example circuit for determining the voltage swing parameters.

Full swing determination circuit 500 includes a min/max calculator 910, a black level latch 920 and a white level latch 930. VSYNC signal resets min/max calculator 910 to a predetermined start state. With each SCLK signal (generated by clock generator 550), min/max circuit receives pixel data value sampled by ADC 510. Min/max calculator 910 includes two registers ("minimum register and maximum register"), one for storing the minimum sampled value and the other for storing the maximum sampled value. These two registers are initialized by VSYNC signal.

In operation, for each received sampled data value, min/max calculator 910 checks whether the data value is lesser than the stored minimum value or is greater the stored maximum value. The minimum and maximum registers are updated according to the comparisons. When a VSYNC pulse is received, the value in the minimum register is transferred to black level latch 920 and the value in the maximum register is transferred to white level latch 930.

As VSYNC pulse is received for each frame, latches 920 and 930 respectively store minimum and maximum sampled values while sampling analog signal for each frame. In the case of a test data encoded in a frame, the maximum sampled value represents white color and minimum value represents black color. Ideally the maximum sampled value and the minimum sampled values should be equal to all ones and all zeros. As should be appreciated, these values may not be all zeroes or all ones due to the mis-match in voltage levels used by ADC 510 and by graphics source 299 in encoding black and white colors. The mis-match may be due to errors in either ADC 510 or graphics source 299.

Accordingly, in an aspect of the present invention, the operation of ADC 510 is modified to take into account these deviations as explained below with reference to FIG. 10. For purposes of illustration, it shall be assumed that ADC 510 uses 8-bits for quantization so that the quantization range is 0–255. It shall be further assumed that a value of 10 has been returned for black color and a value of 237 for the white color.

Figure 10:
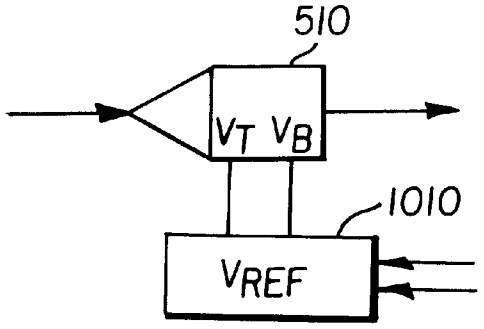
FIG. 10 is a block diagram illustrating a scheme for modifying the operation of ADC to position the quantization range of ADC in the range of the voltage levels in the received signals.

FIG. 10 shows ADC 510 along with VREF circuit 1010. ADC 510 has two inputs Vb and Vt. The voltage level Vb specifies a voltage level below which all voltage levels shall be assumed to be black. The voltage level Vt specifies a voltage level above which all voltage levels shall be assumed to be white.

VREF circuit 1010 receives as input the maximum and minimum values in latches 920 and 930, and generates Vt and Vb so as to adjust the full scale of ADC 510 to be within the voltage levels received on the analog display signals. In the example scenario of above, the Vt voltage shall be lowered and Vb shall be increased. The implementation of VREF circuit 920 will be apparent to one skilled in the relevant arts by reading the description provided herein. The effect of such adjustment is to use the full range of quantization levels of ADC 510. Due to the usage of full range of quantization values, the complete range of brightness level to which an individual pixel can be actuated can be used. As a result, the display quality may be enhanced.

Thus, full swing determination circuit 500 determines the voltages used by graphics source 299 to represent black and white colors and this information is used to ensure that the full range of brightness levels available on a display screen are used to display the voltage swing. Further, source timing measurement circuit 560 determines the start and end positions, which enables accurate sampling of display signal data representing images. Circuits such as full-swing determination circuit 500 and source timing measurement circuit 560 which measure display signal parameters can be termed as display signal parameter measurement circuits. Circuits such as that implemented in signature identification block 570 which merely decode the image data to determine additional display signal parameters, along with the display signal parameters measurement circuits can be termed as display signal parameters determination circuits. As will be appreciated, these circuits can be implemented as individual blocks as explained above, or some of the functions can be integrated into one block.

In addition, all the functions which need to be implemented on graphics source 299 can be implemented using software instructions. Accordingly, the present invention can be implemented as a software utility which can be invoked on user request or automatically (e.g., during computer set up period or when a new display unit is recognized from a plug and play capability).

11. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. In a computer system which includes a graphics source and a display units said display unit being coupled to said graphics source by a communication path, wherein said graphics source sends to said display unit on said communication path a plurality of successive images encoded in a plurality of analog signal frames and said display unit displays each of said plurality of images in response to receiving a cornding one of said plurality of analog signal frames, each of said plurality of successive images being encoded in the active display portion of a plurality of horizontal lines, a method of automatically determining in said display unit one or more display signal parameters used for reproducing and displaying said plurality of images, said method comprising the steps of:

(a) generating a test data having a predetermined format, wherein said format is designed to enable said display unit to determine said one or more display signal parameters;

(b) encoding said test data as an analog signal frame comprising a plurality of horizontal lines, (c) sending said analog signal frame encoded with said test data from said graphics source to said display unit on said communication path, wherein said plurality of analog signal frames encoding said plurality of images are also sent on said communication path;

(d) sending an indication to said display unit on said communication path during a time said active display portions are sent to said display unit, said indication being associated with said analog signal frame encoding said test data, wherein said indication indicates to said display unit that said test data has been encoded in said associated analog signal frame;

(e) receiving in said display unit said analog signal frame sent in step (c) and said indication sent in step (d);

(f) determining in said display unit that said test data is encoded in said analog signal frame according to said associated indication; and (g) examining said log signal frame received in step (e) to determine said one or more display signal parameters, wherein said determined display signal parameters can be used to display images encoded in subsequently received analog signal fames.

2. The method of claim 1, wherein step (a) comprises the steps of:

(h) including data representing brightness greater than a predetermined brightness level in one or more positions of a horizontal line of said analog signal frame encoding said test data, wherein said data representing brightness enables said display unit to determine a horizontal start position and a horizontal end position of said horizontal line;

(i) including data representing a white color and a black color in said test data, wherein said data representing a white color and a black color enables said display unit to determine the voltage levels used by said graphics source to encode a maximum brightness level and a minimum brightness level respectively; and (j) including one or more display signal parameter values in said test data, wherein said one or more display signal parameter values can be ascertained at said graphics source, wherein said display unit can decode said analog signal encoding said test data to determine said display signal parameter values.

3. The method of claim 2, wherein step (j) comprises the step of including values indicative of the number of colors used by said graphics source in representing said plurality of images and the total number of pixels in each horizontal line on said graphics source.

4. The method of claim 1, wherein steps (a), (b), (c) and (d) comprise the steps of:

(k) generating a code value, which when processed along with said test data enables said display unit to determine whether said test data is encoded in said analog signal frame encoded with said test data;

(l) encoding said code value along with said test data in said analog signal frame;

(m) sending said analog signal frame including said test data and said code value to said display unit, wherein said indication comprises said code value.

5. The method of claim 4, wherein step (k) comprises the step of generating said code value according to a cyclic redundancy check (CRC) scheme and modifying the CRC code value such that a desired syndrome value will be generated when the test data with the CRC code is processed according to said CRC scheme.

6. The method of claim 4, further comprising the step of sending from said graphics source to said display unit a horizontal synchronization signal to correspond to said plurality of horizontal lines comprised in said analog signal frame encoding said test data, and wherein step (b) comprises the further step of encoding a single bit in each of said plurality of horizontal lines, and wherein step (g) comprises the step of receiving each said bits using said horizontal synchronization signal.

7. A circuit for use in a display unit of a computer system, said display unit being coupled to a graphics source by a communication path, wherein said graphics source sends to said display unit on said communication path an analog signal representative of a plurality of images and said display unit displays said plurality of images in response to receiving said analog signal, each of said plurality of images being encoded in the active display portion of a plurality of horizontal lines, said circuit for automatically determining in said display unit one or more display signal parameters used for reproducing and displaying said plurality of images, said circuit comprising:

a display signal parameter determination circuit for receiving on said communication path from said graphics source said analog signal, wherein said analog signal includes a plurality of analog signal frames encoded with display data and at least one another analog signal frame encoded with a test data, wherein said display data represents said plurality of images and said test data has a predetermined format which enables said display signal parameter measurement circuit to determine said one or more display signal parameters;

a signature identification block for receiving an indication when said analog signal includes an analog signal frame encoded with said test data, said indication being received on said communication path during a time said active display portions are received, wherein said indication indicates that said analog signal frame includes said test data, said signature identification block determining that said received analog signal frame includes said test data according to said indication; and a micro-controller for receiving said one or more display signal parameters determined by said display signal parameter determination circuit if said signature identification block determines that said test data is received, wherein said display unit uses said received display signal parameters for displaying subsequently received images encoded in said analog signal.

8. The invention of claim 7, wherein said test data includes data values representing brightness greater than a predetermined brightness level in one or more positions of a horizontal line of said analog signal frame encoding said test data, and wherein said display signal parameter determination circuit comprises a source timing measurement circuit for determining a horizontal start position and a horizontal end position of said horizontal line by examining said data representative of brightness greater than a predetermined brightness level.

9. The invention of claim 7, wherein said test data includes a white color and a black color in said test data, and wherein said display signal parameter determination circuit comprises a full swing determination circuit for determining the voltage levels used by said graphics source to encode a maximum brightness level and a minimum brightness level respectively by examining a portion of said analog signal representing said white color and said black color.

10. The invention of claim 7, wherein said indication comprises a CRC code designed to generate a desired syndrome when said CRC code along with said test data is processed by a CRC syndrome generator, and wherein said signature identification means comprises said CRC syndrome generator for generating said desired syndrome when said test data is received.

11. The invention of claim 7, wherein each bit of said test data is encoded in one horizontal line of said analog signal frame encoding said test data, and wherein said signature determination block receives each bit of said test data using a horizontal synchronization signal received with said analog signal frame encoding said test data.

12. A computer system for displaying a plurality of successive images, said computer system comprising:

a display unit for receiving a plurality of successive analog signal frames, each of said plurality of successive analog signal frames representing one of said plurality of successive images, each of said plurality of images being encoded in the active display portion of a plurality of horizontal lines, said display unit reproducing each of said plurality of successive images from said plurality of successive analog signal frames based on a plurality of display signal parameters used for displaying said plurality of successive image encoded in said plurality of successive frames; and a graphics source coupled to said display unit by a communication path, said graphics source for generating said plurality of successive analog signal frames representing said plurality of images, said graphics source designed to send said plurality of successive images on said communication path, said graphics source generating a test data having a predetermined format, wherein said format is designed to enable said display unit to determine said one or more display signal parameters;

said graphics source encoding said test data as an analog signal frame comprising a plurality of horizontal lines and sending said analog signal frame encoded with said test data from said graphics source to said display unit on said communication path;

said graphics source further sending an indication to said display unit indicating that said test data has been encoded in said analog signal, said graphics source sending said indication on said communication path during a time said active display portions are recieved, wherein said display unit determines that said analog signal frame encoded with said test data includes said test data according to said indication, and determines said display signal parameters by examining said analog signal frame encoded with said test data.

13. The computer system of claim 12, wherein said graphics source includes in said test data, data values representing brightness greater than a predetermined brightness level in all positions of a horizontal line of said analog signal frame, and wherein said display unit includes:

a source timing measurement circuit for determining a horizontal start position and a horizontal end position of said horizontal line by examining said data representative of brightness greater than a predetermined brightness level.

14. The computer system of claim 12, wherein said graphics source includes data representing a white color and a black color in said test data, and wherein said display unit includes:

a full swing determination circuit for determining the voltage levels used by said graphics source to encode maximum brightness and minimum brightness levels respectively by examining a portion of said analog signal representing said white color and said black color.

15. The computer system of claim 12, wherein said graphics source includes data display signal parameter values in said test data, said graphics source sending a horizontal synchronization signal to correspond to said plurality of horizontal lines comprised in said analog signal frame encoding said test data, said graphics source encoding only one bit in each of said plurality of horizontal lines, said one bit being encoded as a black color if the bit has a value of zero and as a white color if the bit has a value of one, and wherein said display unit further comprises:

an analog to digital converter (ADC) for sampling said analog signal frame encoding said test data using a sampling clock to generate a plurality of sampled values;

a flip-flop for receiving a most significant bit of said plurality of sampled values, said flip-flop being clocked by said horizontal synchronization signal such that said bits encoded in said each of said plurality of horizontal lines are stored in said flip-flop; and a buffer coupled to said flip-flop for receiving said bits stored in said flip-flop, wherein said bits received by said buffer represent the display signal parameter values encoded in said analog signal frame.

16. The computer system of claim 12, wherein said host generates a code word using a cyclic redundancy check (CRC) scheme and encodes said code word in said analog display frame encoding said test data, said display unit further comprising:

an analog to digital converter (ADC) for sampling said analog signal frame encoding said test data using a sampling clock to generate a plurality of sampled values;

a CRC generator for generating a syndrome value by processing one or more bits of said sampled values, wherein said display unit determines that said sampled values represent said test data if said syndrome value equals a predetermined value.

17. In a computer system which includes a graphics source and a display unit, said display unit being coupled to said graphics source by a communication path, wherein said graphics source sends to said display unit on said communication path a plurality of successive images encoded in a plurality of analog signal frames and said display unit displays each of said plurality of images in response to receiving a corresponding one of said plurality of analog signal frames, each of said plurality of success being encoded in the active display portion of a plurality of horizontal lines, an apparatus for automatically determining in said display unit one or more display signal parameters used for reproducing and displaying said plurality of images, said apparatus comprising:

means for generating a test data having a predetermined format, said means for generating being comprised in said graphics source, wherein said format is designed to enable said display unit to determine said one or more display signal parameters;

means for encoding said test data as an analog signal frame comprising a plurality of horizontal lines, wherein said means for encoding is included in said graphics source;

means for sending said analog signal frame encoded with said test data from said graphics source to said display unit on said communication path;

means for sending an indication to said display unit indicating that said test data has been encoded in said analog signal, said indication being sent or said communication path during a time said active display portions are sent;

means for receiving in said display unit said analog signal sent and said;

means for determining in said display unit that said test data is encoded in said analog signal according to said indication; and means for examining said analog signal frame encoded with said test data to determine said one or more display signal parameters, wherein said determined display signal parameters can be used to display images encoded in subsequently received analog signal frames.

18. The apparatus of claim 17, wherein said means for generating a test data comprises:

means for including data representing brightness greater than a predetermined brightness level in one or more positions of a horizontal line of said analog signal frame, wherein said data representing brightness enables said means for examining to determine a horizontal start position and a horizontal end position of said horizontal line;

means for including data representing a white color and a black color in said test data, wherein said data representing a white color and a black color enables said means for examining to determine the voltage levels used by said graphics source to encode maximum brightness and minimum brightness levels respectively; and means for including display signal parameter values in said test data, wherein said means for examining can decode said analog signal encoding said test data to determine said display signal parameter values.

19. The apparatus of claim 18, wherein said means for sending from said graphics source to said display unit sends a horizontal synchronization signal to correspond to said plurality of horizontal lines comprised in said analog signal frame encoding said test data, and wherein said means for encoding encodes a single bit in each of said plurality of horizontal lines, and wherein said means for examining receives each said bits using said horizontal synchronization signal.

20. A circuit for use in a display unit of a computer system, said display unit being coupled to a graphics source by a communication path, wherein said graphics source sends to said display unit on said communication path a plurality of successive images encoded in a plurality of analog signal frames and said display unit displays each of said plurality of images in response to receiving a corresponding one of said plurality of analog signal frames, each of said plurality of successive images being encoded in the active display portion of a plurality of horizontal lines, said circuit for automatically determining in said display unit one or more display signal parameters used for reproducing and displaying said plurality of images, said circuit comprising:

means for receiving said plurality of analog signal frames and an another analog signal frame from said graphics source, wherein said analog signal frame is encoded with a test data having a predetermined format, said means for receiving further receiving an indication from said graphics source, said indication indicating that said another analog signal film is encoded with said test data, said indication being received on said communication path during a time said active display portions are received;

means for determining in said display unit that said test data is encoded in said analog signal according to said indication; and means for examining said another analog signal frame to determine said one or more display signal parameters, wherein said determined display signal parameters can be used by said display unit to display images encoded in subsequently received analog signal frames.

21. The method of claim 1, wherein said indication includes data encoded in said plurality of analog signal frames.

22. The circuit of claim 7, wherein said indication includes data encoded in said plurality of analog signal frames.

23. The computer system of claim 12, wherein said indication includes data encoded in said plurality of analog signal frames.

24. The apparatus of claim 17, wherein said indication includes data encoded in said plurality of analog signal frames.

25. The circuit of claim 20, wherein said indication includes data encoded in said plurality of analog signal frames.

* * * * *